Figure 1:
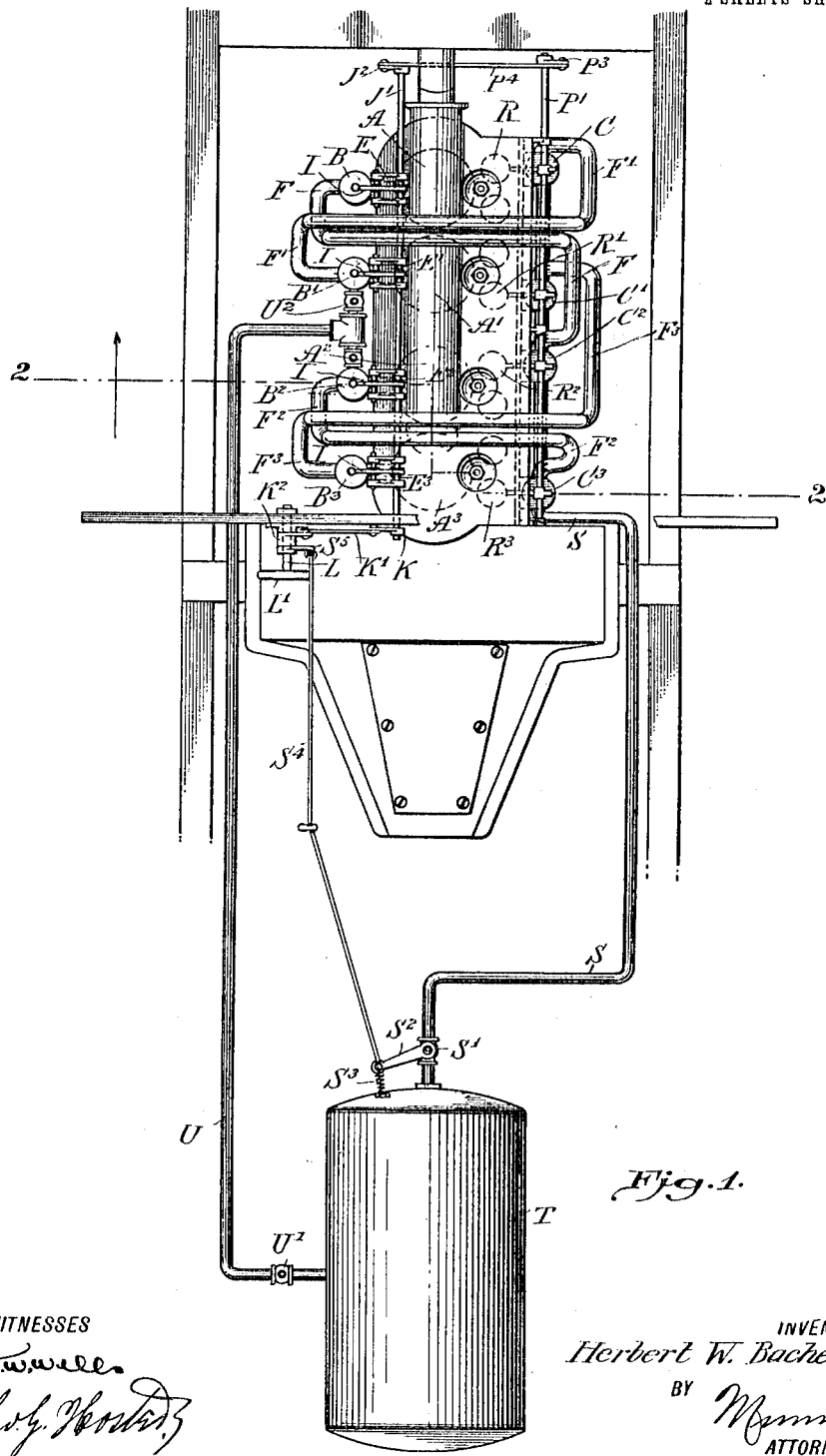

H. W. BACHELDER.
ENGINE STARTER.
APPLICATION FILED OCT. 15, 1913.

1,106,180.

Patented Aug. 4, 1914.

2 SHEETS—SHEET 1.

WITNESSES

INVENTOR
Herbert W. Bachelder
BY
ATTORNEYS

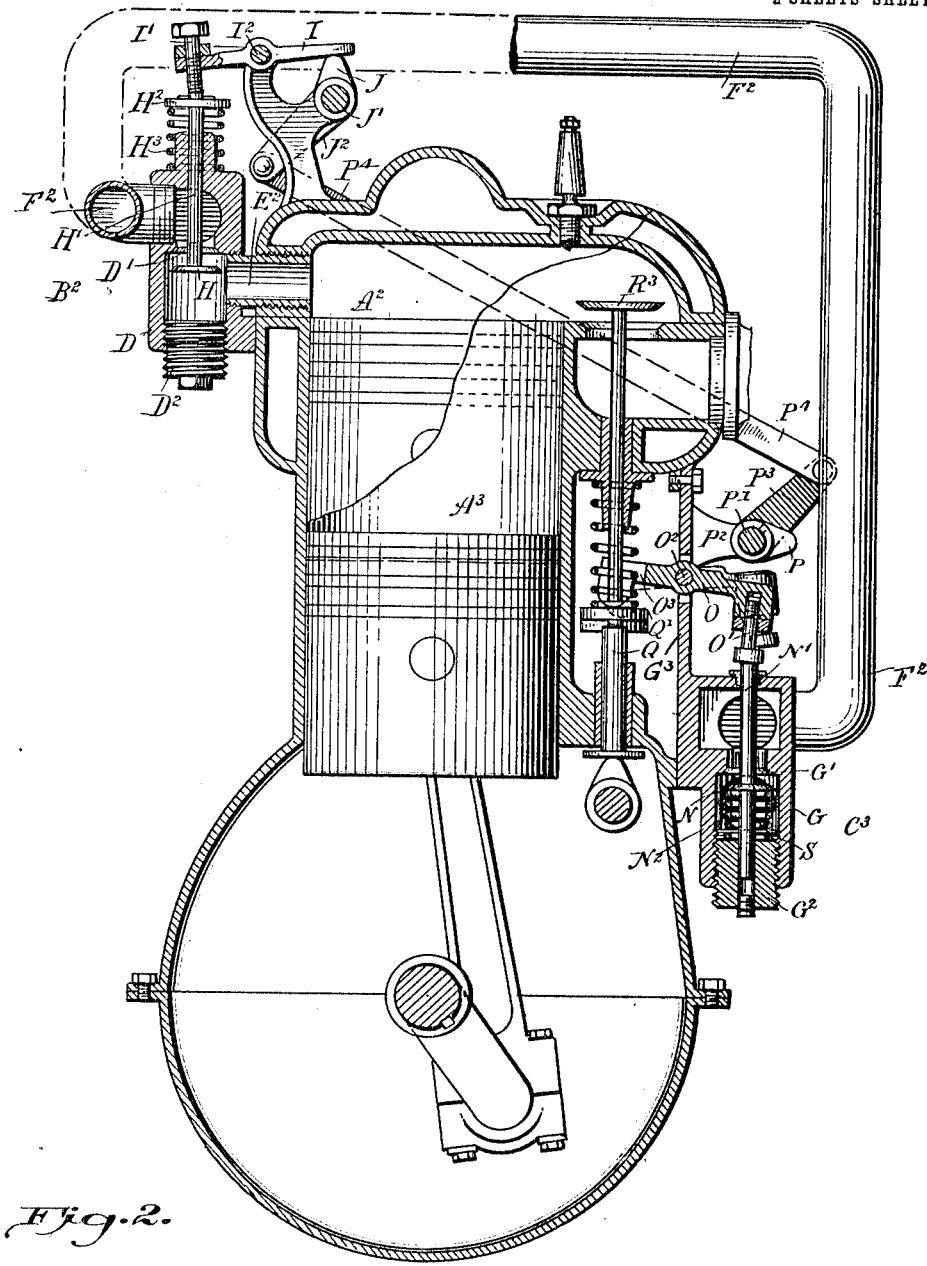

UNITED STATES PATENT OFFICE.

HERBERT WALTER BACHELDER, OF HERKIMER, NEW YORK.

ENGINE-STARTER.

1,106,180.　　　　　Specification of Letters Patent.　　Patented Aug. 4, 1914.

Application filed October 15, 1913. Serial No. 795,262.

*To all whom it may concern:*

Be it known that I, HERBERT W. BACHELDER, a citizen of the United States, and a resident of Herkimer, in the county of Herkimer and State of New York, have invented a new and Improved Engine - Starter, of which the following is a full, clear, and exact description.

The invention relates to internal combustion engines, and its object is to provide a new and improved engine starter arranged to permit the chauffeur or other operator of an automobile or other vehicle to quickly and readily start the engine without resorting to cranking.

In order to accomplish the desired result use is made of a pressure controlling valve connected with a pressure supply tank and adapted to be opened by the operating mechanism of the exhaust valve of the engine, a manually - controlled actuating mechanism for normally holding the said controlling valve open and out of engagement with the said operating mechanism of the exhaust valve, an admission valve connected with the said controlling valve and with an engine cylinder, and manually controlled mechanism for opening the said admission valve.

A practical embodiment of the invention is represented in the accompanying drawings forming a part of this specification, in which similar characters of reference indicate corresponding parts in both views.

Figure 1 is a plan view of the engine starter as applied to a 4-cylinder internal combustion engine; and Fig. 2 is an enlarged cross section of the same on the line 2—2 of Fig. 1.

The internal combustion engine illustrated in the drawings is provided with four cylinders A, A', $A^2$ and $A^3$, the usual means for admitting explosive charges successively to the said cylinders, and means for exhausting the products of combustion from the said cylinders. The engine starter applied to this engine is arranged as follows, use being made of admission valves B, B', $B^2$ and $B^3$ and pressure controlling valves C, C', $C^2$ and $C^3$, shown as located on opposite sides of the corresponding cylinders A, A', $A^2$ and $A^3$. Each of the admission valves B, B', $B^2$ and $B^3$ is provided with a valve body D and the several valve bodies D of the admission valves B, B', $B^2$ and $B^3$ are connected by pipes E, E', $E^2$ and $E^3$ with the working chambers of the corresponding cylinders A, A', $A^2$ and $A^3$. The body D of the valve B is connected by a pipe F with the valve body G of the controlling valve $C^2$ (see Fig. 1), the body D of the valve B' is connected by a pipe F' with the body G of the controlling valve C, the body D of the valve $B^2$ is connected with the body G of the controlling valve $C^3$ by a pipe $F^2$, and the body D of the valve $B^3$ is connected by a pipe $F^3$ with the body G of the controlling valve C'. Each valve body D is provided intermediate the corresponding pipes E, F; E', F'; $E^2$, $F^2$; and $E^3$, $F^3$; with a valve seat D', shown in Fig. 2, and on the said valve seat D' is normally seated a valve H provided with an upwardly - extending valve stem H' slidably mounted in the body D. On the upper outer end of the valve stem H' is held a washer $H^2$ pressed on by a spring $H^3$ seated on the valve body D to normally hold the valve H' in closed position. The bottom of the body D is provided with a screw plug $D^2$ for obtaining access to the inside of the valve body D for cleaning or repairing purposes. The upper end of the valve stem H' is engaged by a screw rod I' held adjustable in a lever I, and the several levers I for the valves B, B', $B^2$ and $B^3$ are fulcrumed on a rod $I^2$ mounted on top of the engine. The several levers I are engaged by cams J held on a cam shaft J' journaled on the top of the engine and one end of the shaft J' is provided with an arm K connected by a link K' with an arm $K^2$ on a shaft L under the control of the chauffeur or other person in charge of the engine. When the operator turns the hand wheel L' a rocking motion is given to the rock shaft J' which by its cam J actuates the several levers I with a view to move the valves H from their normal closed position into open position against the tension of their springs $H^3$. When this takes place the corresponding pipes E, F; E', F'; $E^2$, $F^2$; and $E^3$, $F^3$ are in communication with each other by way of the valve bodies D.

Each of the valve bodies G of the controlling valves C, C', $C^2$ and $C^3$ is provided with a valve seat G' controlled by a valve N normally in open position and provided with a valve stem N' on which is coiled a spring $N^2$ pressing against the under side of the valve N and resting on a screw plug $G^2$ arranged in the bottom of the valve body G. The upper end of the valve stem N' is engaged by a screw O' held adjustable in one end of a lever O fulcrumed at $O^2$ on a bracket $G^3$ extending from the body G of the corresponding controlling valve C, C', $C^2$ or $C^3$. The levers O for the several controlling valves C, C', $C^2$ and $C^3$ are engaged by cams P held on a cam shaft P' journaled in suitable bearings arranged on brackets $P^2$ attached to the engine, and one end of the shaft P' is provided with an arm $P^3$ connected by a link $P^4$ with an arm $J^2$ secured on the shaft J' so that when a rocking motion is given to the shaft J', as previously explained, then a similar rocking movement is given to the cam shaft P' to cause the cams P to release the several levers O with a view to allow the springs $N^2$ to move the valves N into closed position on the several seats G'.

It is understood that the cams P are normally in engagement with the levers O to hold the several valves N of the controlling valves C, C', $C^2$ and $C^3$ in open position. The levers O are provided at their free ends with forks $O^3$ adapted to be engaged by the actuating mechanisms Q for the several exhaust valves R, R', $R^2$ and $R^3$ for the cylinders A, A', $A^2$ and $A^3$ of the engine. As long as the cams P depress the levers O with a view to hold the valves N in open position the forked ends $O^3$ of the said levers O are out of engagement with the actuating mechanisms Q, but when the cam shaft P is turned and the cams P swing out of engagement with the levers O then the valves N move into closed position by the action of the springs $N^2$ and the forked ends of the levers $O^3$ move into engagement with the collars Q' of the actuating mechanisms Q so that whichever exhaust valve is held open by its corresponding actuating mechanism Q causes the lever to be held in active position with a view to hold the corresponding valve N in open position.

The valve bodies G of the several valves C, C', $C^2$ and $C^3$ are connected with a pressure supply pipe S having a valve S', and connected with a pressure supply tank T charged with a fluid under pressure either by the use of a pump or by connecting the tank T by a pipe U with one or more of the cylinders A, A', $A^2$ or $A^3$ by way of the corresponding valve B, B', $B^2$ or $B^3$ and pipe E, E', $E^2$ or $E^3$ to charge the tank T with pressure from the corresponding cylinder or cylinders when the engine is running. As shown the pipe U is connected with the lower ends of the valves B' and $B^2$. The pipe U is provided with a check valve U' to prevent return flow of the pressure tank T to the corresponding cylinder or cylinders, and the pipe U is provided adjacent the valves B', $B^2$ with shut-off valves $U^2$. The valve S' in the pipe S is provided on its valve stem with an arm $S^2$ pressed on by a spring $S^3$ and connected by a link $S^4$ with an arm $S^5$ held on the shaft L so that when the latter is turned by the operator manipulating the hand wheel L' then the normally closed valve S' is opened against the tension of the spring $S^3$, and when this takes place the fluid under pressure contained in the tank T can flow by way of the pipe S into the several valve bodies G of the controlling valves C, C', $C^2$ and $C^3$. The fluid pressure can pass from the valve body G by the valve N which happens to open by the action of the corresponding exhaust valve of the engine to the corresponding valve B, B', $B^2$ or $B^3$, from which the fluid pressure can pass into the corresponding cylinder A, A', $A^2$ or $A^3$ by way of the pipe E, E', $E^2$ or $E^3$. It is understood that the pipes F, F', $F^2$ and $F^3$ are so arranged as to supply pressure from the tank T to that cylinder in which the piston is at the beginning of the working stroke, while the exhaust valve of the cylinder containing the connected controlling valve C, C', $C^2$ or $C^3$ is open.

The operation is as follows: On stopping a four-cylinder internal combustion engine of the four-cycle type, the piston in one of the cylinders stands at or near the beginning of the power or explosion stroke, while the exhaust valve of another cylinder is open and, as shown in Fig. 1, the pipes F, F', $F^2$ and $F^3$ are connected with the corresponding valves B, $C^2$; B', C; $B^2$, $C^3$; and $B^3$, C'; in accordance with the conditions above set forth. Presuming that the engine is stopped with the exhaust valve $R^3$ open and the piston in the cylinder $A^2$ at the beginning of the working stroke, the operator turns the hand wheel L' so as to impart a rocking motion simultaneously to both shafts J' and P' whereby all the valves H are opened and all the valves N except that of the supply valve $C^3$ are closed so that pressure from the tank T can pass by way of the pipe S through the valve $C^3$ and by way of the pipe $F^2$ into the valve $B^2$ and through the same, and by way of the pipe $E^2$ into the working chamber of the cylinder $A^2$ to force the piston B therein downward thereby starting the engine. When the piston of the cylinder $A^2$ reaches the end of its down stroke the exhaust valve $R^3$ of the cylinder $A^3$ moves into closed position, but at this time the exhaust valve $R^2$ of the cylinder $A^2$ moves into open position and in doing so it actuates the corresponding lever O of the controlling valve $C^2$ to open the valve N thereof whereby the fluid pressure from the tank T and pipe S is now passed by way of the valve $C^2$, the pipe F, valve H and pipe E into the cylinder A in which the piston is now at the beginning of its working stroke, so that the fluid pressure admitted into this cylinder A forces the piston downward therein to keep the engine started. When the piston in the cylinder A reaches the end of its downward stroke the exhaust valve R of this cylinder A opens and in so doing the lever O of the valve C is actuated by the actuating mechanism Q of the exhaust valve R. When this takes place the valve N of the controlling valve C is moved into open position to allow the fluid pressure from the tank T and pipe S to pass by way of the valve C and pipe F', valve B' and pipe E' into the cylinder A' in which the piston is now at the beginning of its working stroke. The pressure admitted into the cylinder A' forces the piston downward therein, and when this piston reaches the end of its downward stroke the exhaust valve R' opens whereby the valve N in the controlling valve C' is opened to cause fluid pressure from the tank T and pipe S to pass by way of the controlling valve C', pipe $F^3$, valve $B^3$ and pipe $E^3$ into the cylinder $A^3$ in which the piston is now at the beginning of its working stroke. The fluid pressure forces this piston downward to keep the engine started and when this piston reaches the end of its downward stroke the exhaust valve $R^3$ is opened to open the valve N in the supply valve $C^3$, and the above-described operation is repeated.

Thus from the foregoing it will be seen that by the arrangement described the fluid pressure is successively admitted to the several cylinders at the time their pistons are at the beginning of their working strokes to start the engine and keep the same going until the explosive charges are admitted to the cylinder and ignited therein. When this takes place the operator turns the hand wheel L' in the reverse direction to cause the rock shafts J' and P' to return to their normal positions with a view to allow all the valves H to close and to open all the valves N so that the actuating mechanisms Q for the exhaust valves R, R', $R^2$ and $R^3$ do not affect the levers O.

It is understood that the levers O are forked for the free passage of the stems of the exhaust valves R, R', $R^2$ and $R^3$, and the said levers O are normally pressed by the cams P to hold the valves N open and to hold the forked ends $O^3$ of the levers O above the collars Q' of the operating mechanisms Q for the exhaust valves R, R', $R^2$, $R^3$. When the engine is at rest one of the operating mechanisms Q for the exhaust valves R, R', $R^2$, $R^3$ is in raised position holding the corresponding exhaust valve in open position, and hence when the cams P are swung out of engagement with the levers O all the valves N close except the valve N of which its lever O is engaged by the collar Q' of the operating mechanism Q for the exhaust valve R, R', $R^2$ or $R^3$ in open position at the time.

Having thus described my invention, I claim as new and desire to secure by Letters Patent:

1. An engine starter comprising a pressure controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure controlling valve and with an engine cylinder to supply the latter with fluid pressure, and manually controlled actuating mechanism for opening the said admission valve.

2. An engine starter, comprising a pressure controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure controlling valve and with an engine cylinder to supply the latter with fluid pressure, manually-controlled actuating mechanism for opening the said admission valve, and a manually-controlled operating mechanism connected with the said actuating mechanisms for the pressure controlling valve and the said admission valve.

3. An engine starter, comprising a pressure controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure controlling valve and with an engine cylinder to supply the latter with fluid pressure, manually-controlled actuating mechanism for opening the said admission valve, a fluid pressure supply tank, a pipe having a valve and connecting the said pressure supply tank with the pressure controlling valve, and a manually-controlled operating mechanism connected with the said actuating mechanisms and with the said pipe valve.

4. An engine starter, comprising a pressure-controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure controlling valve and with an engine cylinder to supply the latter with fluid pressure, manually-controlled actuating mechanism for opening the said admission valve, a fluid pressure supply tank connected with the said pressure-controlling valve, and a pipe connecting one of the engine cylinders with the said pressure-controlling tank to charge the latter with pressure from the engine cylinder.

5. An engine starter, comprising a pressure-controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure-controlling valve and with an engine cylinder to supply the latter with fluid pressure, manually-controlled actuating mechanism for opening the said admission valve, a fluid pressure supply tank connected with the said pressure-controlling valve, a pipe connecting one of the engine cylinders with the said pressure controlling tank to charge the latter with pressure from the engine cylinder, and a check valve in the said pipe.

6. An engine starter, comprising a pressure-controlling valve connected with a source of pressure supply and adapted to be opened by the operating mechanism of the exhaust valve of the engine, a manually-controlled actuating mechanism for normally holding the said controlling valve normally open and out of engagement with the said operating mechanism of the exhaust valve, an admission valve connected with the said pressure-controlling valve and with an engine cylinder to supply the latter with fluid pressure, manually-controlled actuating mechanism for opening the said admission valve, a fluid pressure supply tank connected with the said pressure-controlling valve, a pipe connecting one of the engine cylinders with the said pressure-controlling tank to fill the latter with pressure from the engine cylinder, a check valve in the said pipe, a pipe connecting the said tank with the said pressure-controlling valve and provided with a valve, and a manually-controlled operating mechanism connected with the said actuating mechanisms and the said pipe valve.

7. An engine starter, comprising normally closed admission valves connected with the working chambers of the cylinders of the engine, normally open controlling valves connected with a source of fluid pressure supply and with the said admission valves, actuating means under the control of the operator for holding the said admission valves normally open, and means controlled by the operating mechanism of the engine exhaust valves and adapted to hold the said controlling valves open after being released by their actuating means.

8. An engine starter, comprising normally closed admission valves connected with the working chambers of the cylinders of the engine, normally open controlling valves connected with a source of fluid pressure supply and with the said admission valves, actuating means under the control of the operator for holding the said admission valves normally closed and the said controlling valves normally open, means controlled by the operating mechanism of the engine exhaust valves and adapted to hold the said controlling valves open after being released by their actuating means, springs for closing the said admission valves, and springs for closing the said controlling valves.

9. An engine starter provided with a fluid pressure controlling valve connected with a source of fluid pressure supply and adapted to supply an engine cylinder with fluid pressure, a manually-controlled actuating mechanism for normally holding the said valve open, a spring for closing the said valve, and means controlled by the operating mechanism of an exhaust valve for opening the said valve after being released by the said manually-controlled actuating mechanism.

10. The combination with a multi-cylinder internal combustion engine of a starting device for the said engine and having supply controlling valves, admission valves, one for each cylinder and each connected with a supply-controlling valve, means for controlling the said supply controlling valve of one cylinder from the actuating mechanism of the exhaust valve of another cylinder, manually-controlled means for normally holding the supply controlling valves open and the said admission valves closed, and springs for closing the said valves.

11. In an engine starter of the character described, a spring pressed admission valve, a spring pressed fluid pressure controlling valve, a pivoted lever for operating each of the said valves, cams operatively connected with each other for acting upon said levers, and manually controlled means for operating one of the said cams.

12. In an engine starter of the character described, a spring pressed admission valve, a spring pressed fluid pressure controlling valve, a pivoted lever for operating each of the said valves, a rock shaft carrying a cam for engaging one of the levers and provided with a crank arm at one end, a second rock shaft carrying cam for engaging the other lever and provided with a crank arm at one end, a link connecting the crank arms of the said shafts, and manually controlled means for operating the first named rock shaft.

13. In an engine starter of the character described a spring pressed admission valve, a spring pressed fluid pressure controlling valve, a pivoted lever for operating each of the said valves, a cam for operating each lever, means for operatively connecting the cams, an exhaust valve with which the lever for operating the valve of the fluid pressure valve operatively engages, and manually controlled means for operating one of the said cams.

In testimony whereof I have signed my name to this specification in the presence of two subscribing witnesses.

HERBERT WALTER BACHELDER.

Witnesses:
GEORGE F. WALLACE,
ELLING A. BRAYTON.

Copies of this patent may be obtained for five cents each, by addressing the "Commissioner of Patents, Washington, D. C."